US012283160B2

(12) United States Patent
Moore et al.

(10) Patent No.: US 12,283,160 B2
(45) Date of Patent: Apr. 22, 2025

(54) PARTICIPATION AWARDS FOR WIDE-AREA PROGRESSIVE WAGERING GAMES

(71) Applicant: IGT, Las Vegas, NV (US)

(72) Inventors: Joe Moore, Reno, NV (US); Christian Theumer, Sparks, NV (US); Timothy Shortall, Ocean View, NJ (US)

(73) Assignee: IGT, Las Vegas, NV (US)

( * ) Notice: Subject to any disclaimer, the term of this patent is extended or adjusted under 35 U.S.C. 154(b) by 66 days.

(21) Appl. No.: 17/443,511

(22) Filed: Jul. 27, 2021

(65) Prior Publication Data

US 2023/0030404 A1 Feb. 2, 2023

(51) Int. Cl.
*G07F 17/32* (2006.01)

(52) U.S. Cl.
CPC ...... *G07F 17/3258* (2013.01); *G07F 17/3213* (2013.01); *G07F 17/329* (2013.01)

(58) Field of Classification Search
CPC .. G07F 17/32; G07F 17/3213; G07F 17/3239; G07F 17/3244; G07F 17/3258; G07F 17/34
See application file for complete search history.

(56) References Cited

U.S. PATENT DOCUMENTS

| | | | | | |
|---|---|---|---|---|---|
| 5,564,700 | A * | 10/1996 | Celona | G07F 17/32 | 463/20 |
| 6,319,125 | B1 * | 11/2001 | Acres | G07F 17/32 | 463/25 |
| 6,336,862 | B1 * | 1/2002 | Byrne | G07F 17/32 | 273/138.2 |
| 6,565,434 | B1 * | 5/2003 | Acres | G07F 17/32 | 463/25 |
| 6,887,154 | B1 * | 5/2005 | Luciano, Jr. | G07F 17/3258 | 463/26 |
| 7,568,973 | B2 * | 8/2009 | Iddings | G07F 17/32 | 463/25 |

(Continued)

OTHER PUBLICATIONS

"Omni-Channel Customer Engagement Platform," IGT Solutions, © 2021 IGT Solutions Pvt. Ltd. (downloaded from the internet Jul. 27, 2021) https://www.igtsolutions.com/services/cx-transformation/omni-channel-crm/ 11 pages.

(Continued)

*Primary Examiner* — Milap Shah
(74) *Attorney, Agent, or Firm* — Sage Patent Group

(57) ABSTRACT

A secondary progressive award is provided for a wide-area progressive wagering game as a celebration or participation award. A processor circuit determines that a winning condition for a wide-area progressive wagering game has been satisfied for a gaming device of a plurality of eligible gaming devices. For each gaming device of the plurality of eligible gaming devices, it is determined whether the gaming device meets a predetermined activity condition, and a subset of active gaming devices of the plurality of eligible gaming devices is determined based on the active gaming devices meeting the predetermined activity condition. A primary progressive award is provided to a user of the a gaming device associated with the winning condition, and a secondary progressive award is provided to each gaming device of the determined subset of active gaming devices.

17 Claims, 10 Drawing Sheets

(56) References Cited

U.S. PATENT DOCUMENTS

| | | | | |
|---|---|---|---|---|
| 7,597,621 | B2 * | 10/2009 | Baerlocher | G07F 17/3258<br>463/43 |
| 9,940,786 | B1 * | 4/2018 | Lucci | G07F 17/3286 |
| 2003/0040355 | A1 * | 2/2003 | Baerlocher | G07F 17/32<br>463/20 |
| 2004/0242320 | A1 * | 12/2004 | Jackson | G07F 17/3244<br>463/26 |
| 2005/0043082 | A1 * | 2/2005 | Peterson | G07F 17/32<br>463/20 |
| 2006/0040736 | A1 * | 2/2006 | Baerlocher | G07F 17/3216<br>463/27 |
| 2006/0160612 | A1 * | 7/2006 | Parham | G07F 17/3244<br>463/25 |
| 2007/0167210 | A1 * | 7/2007 | Kelly | G07F 17/3232<br>463/16 |
| 2009/0117979 | A1 * | 5/2009 | Decasa, Jr. | G07F 17/32<br>463/20 |
| 2009/0264177 | A1 * | 10/2009 | Walker | G07F 17/32<br>463/43 |
| 2009/0305777 | A1 * | 12/2009 | Anderson | G07F 17/3258<br>463/27 |
| 2011/0111843 | A1 * | 5/2011 | Nicely | G07F 17/3258<br>463/27 |
| 2012/0009993 | A1 * | 1/2012 | Wright | G07F 17/3258<br>463/26 |
| 2013/0059648 | A1 * | 3/2013 | Rowe | G07F 17/3248<br>463/25 |
| 2014/0024444 | A1 * | 1/2014 | Lowell | G07F 17/3258<br>463/27 |
| 2020/0202670 | A1 * | 6/2020 | Hiten | G07F 17/3248 |

OTHER PUBLICATIONS

"PlayDigital," IGT, © 2021 IGT (downloaded from the internet Jul. 27, 2021) https://www.igt.com/products-and-services/playdigital 3 pages.

"CrystalCurve ULTRA," IGT, © 2021 IGT (downloaded from the internet Jul. 27, 2021) https://www.igt.com/products-and-services/gaming/cabinets/crystalcurve-ultra 3 pages.

* cited by examiner

PARTICIPATION AWARDS FOR WIDE-AREA PROGRESSIVE WAGERING GAMES

BACKGROUND

Embodiments described herein relate to game play features with electronic wagering games, and in particular to participation awards for wide area progressive wagering game, such as in a casino environment, lottery environment, and/or mobile wagering environment, and related devices, systems, and methods.

Gaming devices may provide players awards in primary games. Gaming devices generally require the player to place a wager to activate the primary game. The award may be based on the player obtaining a winning symbol or symbol combination and on the amount of the wager. In addition, many wagering games may include a progressive wagering game, in which a portion of certain wagers at a number of wagering games and/or gaming devices may contribute to a progressive prize pool, with a progressive game award being provided to a player that triggers a winning progressive game result.

BRIEF SUMMARY

According to some embodiments, a system includes a processor circuit and a memory including machine-readable instructions. When executed by the processor circuit, the machine-readable instructions cause the processor circuit to determine that a winning condition for a wide-area progressive wagering game has been satisfied for a gaming device of a plurality of eligible gaming devices. The machine-readable instructions further cause the processor circuit to determine a subset of active gaming devices of the plurality of eligible gaming devices, each active gaming device of the subset of active gaming devices including an active gaming session associated with a user of the active gaming device. The machine-readable instructions further cause the processor circuit to provide a primary progressive award to a user of the gaming device associated with the winning condition. The machine-readable instructions further cause the processor circuit to provide a secondary progressive award to each gaming device of the determined subset of active gaming devices.

According to some embodiments, a gaming device includes a processor circuit and a memory including machine-readable instructions. When executed by the processor circuit, the machine-readable instructions cause the processor circuit to receive a first message from a progressive wagering game server. The first message includes instructions that cause the processor circuit to determine whether the gaming device meets a predetermined activity condition, and transmit a responsive message to the progressive wagering game server, the second message including an indication of whether the gaming device meets the predetermined activity condition. The machine-readable instructions further cause the processor circuit to receive a second message from a progressive wagering game server, the message including instructions that cause the processor circuit to provide a secondary progressive award to a user of the gaming device associated with the predetermined activity condition.

According to some embodiments, a method includes determining, by a processor circuit, that a winning condition for a wide-area progressive wagering game has been satisfied for a gaming device of a plurality of eligible gaming devices. The method further includes determining, for each gaming device of the plurality of eligible gaming devices, whether the gaming device meets a predetermined activity condition. The method further includes determining a subset of active gaming devices of the plurality of eligible gaming devices, each active gaming device of the subset of active gaming devices meets the predetermined activity condition. The method further includes providing a primary progressive award to a user of the gaming device associated with the winning condition. The method further includes providing a secondary progressive award to each gaming device of the determined subset of active gaming devices.

DETAILED DESCRIPTION

Embodiments described herein relate to game play features with electronic wagering games, and in particular to participation awards for wide area progressive wagering game, such as in a casino environment, lottery environment, and/or mobile wagering environment, and related devices, systems, and methods.

In some embodiments, a Wide Area Progressive (WAP) includes a primary award, which may be provided to a single player that triggers a winning progressive game result at a particular gaming device, and a secondary award, which may be provided to the players at some or all of the active gaming devices associated with the WAP network (i.e., WAP link) when the primary award is awarded. In some examples, this secondary award may be referred to as a celebration award or bonus, or a participation award or bonus. For example, in response to a primary award, the WAP server would determine a subset of active gaming devices on the WAP network and cause each active gaming device to provide the secondary award. In some examples, the secondary award may be a monetary payout, such as a printed bearer receipt or ticket that can be redeemed by the player of the active gaming device. The secondary award may also be awarded in the form of a cashable or non-cashable credits (e.g., live adjustment of an active credit meter) at the active gaming device, or a non-monetary award, such as a specific prize (e.g., show tickets, limited edition guitar, etc.). These and other technical solutions address the technical problem of incentivizing wider participation in WAP games and enhancing player enjoyment.

Figure 1:
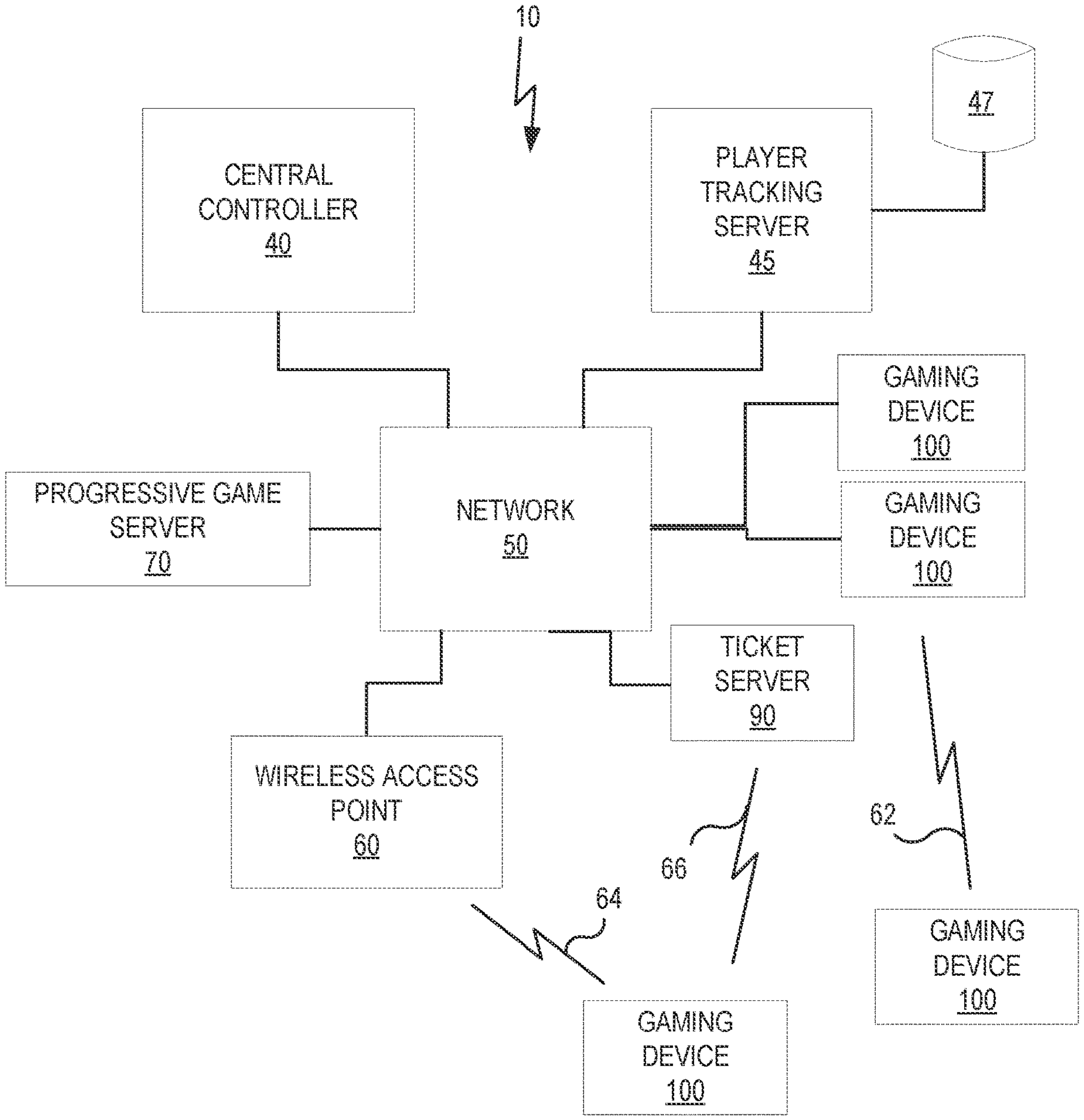
FIG. 1 is a schematic block diagram illustrating a network configuration for a plurality of gaming devices according to some embodiments.

Referring now to FIG. 1, a gaming system 10 including a plurality of gaming devices 100 is illustrated. As discussed above, the gaming devices 100 may be one type of a variety of different types of gaming devices, such as electronic gaming machines (EGMs), mobile gaming devices, or other devices, for example. The gaming system 10 may be located, for example, on the premises of a gaming establishment, such as a casino. The gaming devices 100, which are typically situated on a casino floor, may be in communication with each other and/or at least one central controller 40 through a data communication network 50 that may include a remote communication link. The data communication network 50 may be a private data communication network that is operated, for example, by the gaming facility that operates the gaming devices 100. Communications over the data communication network 50 may be encrypted for security. The central controller 40 may be any suitable server or computing device which includes at least one processing circuit and at least one memory or storage device. Each gaming device 100 may include a processing circuit that transmits and receives events, messages, commands or any other suitable data or signal between the gaming device 100 and the central controller 40. The gaming device processing circuit is operable to execute such communicated events, messages or commands in conjunction with the operation of the gaming device 100. Moreover, the processing circuit of the central controller 40 is configured to transmit and receive events, messages, commands or any other suitable data or signal between the central controller 40 and each of the individual gaming devices 100. In some embodiments, one or more of the functions of the central controller 40 may be performed by one or more gaming device processing circuits. Moreover, in some embodiments, one or more of the functions of one or more gaming device processing circuits as disclosed herein may be performed by the central controller 40.

A wireless access point 60 provides wireless access to the data communication network 50. The wireless access point 60 may be connected to the data communication network 50 as illustrated in FIG. 1, and/or may be connected directly to the central controller 40 or another server connected to the data communication network 50.

A player tracking server 45 may also be connected through the data communication network 50. The player tracking server 45 may manage a player tracking account that tracks the player's gameplay and spending and/or other player preferences and customizations, manages loyalty awards for the player, manages funds deposited or advanced on behalf of the player, and other functions. Player information managed by the player tracking server 45 may be stored in a player information database 47.

As further illustrated in FIG. 1, the gaming system 10 may include a ticket server 90 that is configured to print and/or dispense wagering tickets. The ticket server 90 may be in communication with the central controller 40 through the data communication network 50. Each ticket server 90 may include a processing circuit that transmits and receives events, messages, commands or any other suitable data or signal between the ticket server 90 and the central controller 40. The ticket server 90 processing circuit may be operable to execute such communicated events, messages or commands in conjunction with the operation of the ticket server 90. Moreover, in some embodiments, one or more of the functions of one or more ticket server 90 processing circuits as disclosed herein may be performed by the central controller 40.

In this example, a progressive game server 70 controls and manages a progressive wagering game, such as a WAP for example, across multiple gaming devices 100. In this simplified example, the eligible gaming devices 100 are interconnected though a common data communication network 50, but as will be described in greater detail below, it should be understood that eligible gaming devices 100 may participate in the WAP across a plurality of networks, which located across different locations, properties, and/or jurisdictions, etc.

The gaming devices 100 communicate with one or more elements of the gaming system 10 to coordinate providing wagering games and other functionality. For example, in some embodiments, the gaming device 100 may communicate directly with the ticket server 90 over a wireless interface 62, which may be a WiFi link, a Bluetooth link, a near field communications (NFC) link, etc. In other embodiments, the gaming device 100 may communicate with the data communication network 50 (and devices connected thereto, including other gaming devices 100) over a wireless interface 64 with the wireless access point 60. The wireless interface 64 may include a WiFi link, a Bluetooth link, an NFC link, etc. In still further embodiments, the gaming devices 100 may communicate simultaneously with both the ticket server 90 over the wireless interface 66 and the wireless access point 60 over the wireless interface 64. Some embodiments provide that gaming devices 100 may communicate with other gaming devices over a wireless interface 64. In these embodiments, wireless interface 62, wireless interface 64 and wireless interface 66 may use different communication protocols and/or different communication resources, such as different frequencies, time slots, spreading codes, etc.

Figure 2A:
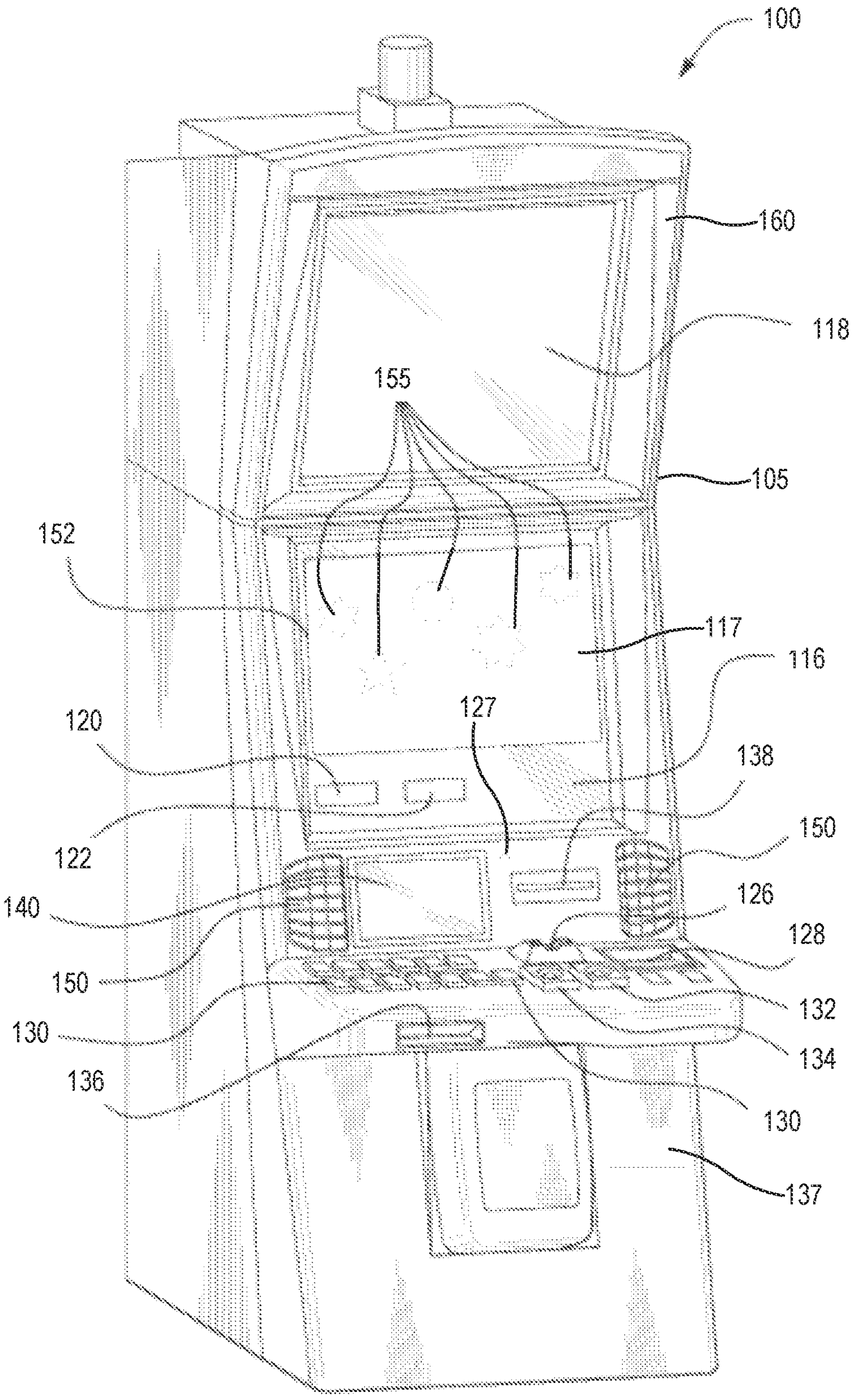
FIG. 2A is a perspective view of a gaming device that can be configured according to some embodiments.
Figure 2B:
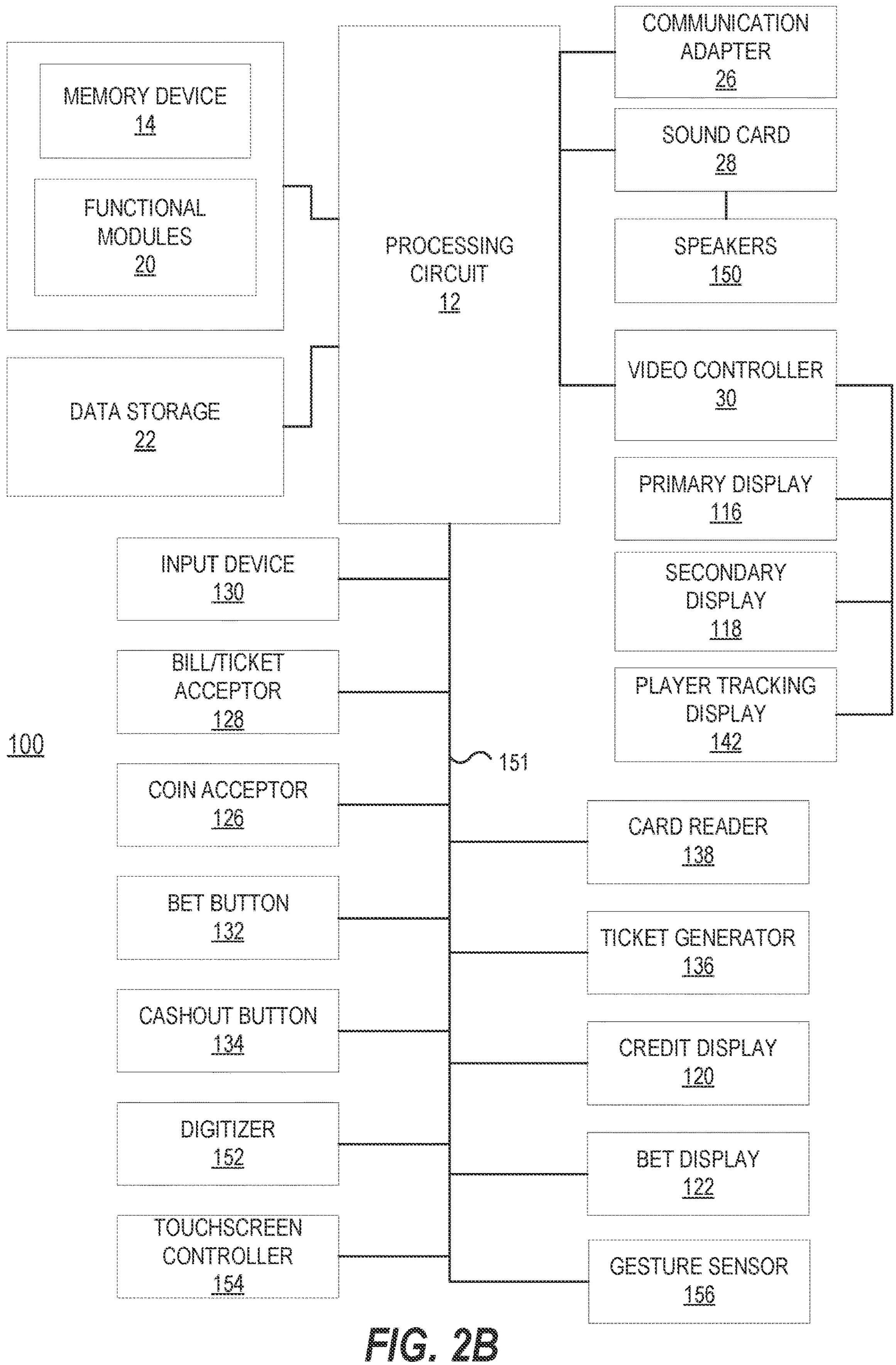
FIG. 2B is a schematic block diagram illustrating an electronic configuration for a gaming device according to some embodiments.
Figure 2C:
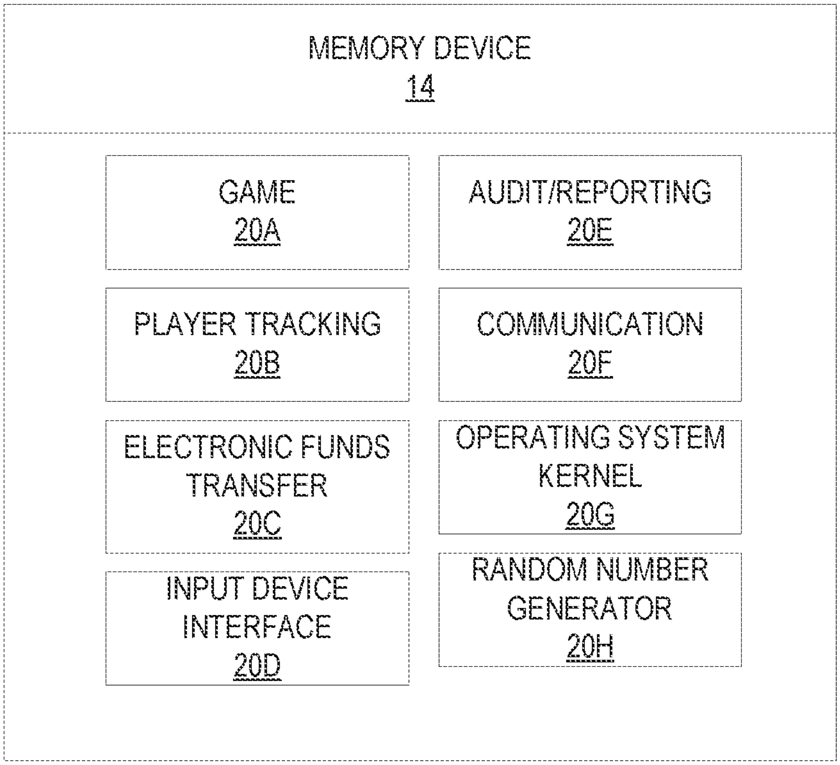
FIG. 2C is a schematic block diagram that illustrates various functional modules of a gaming device according to some embodiments.

Embodiments herein may include different types of gaming devices. One example of a gaming device includes a gaming device 100 that can use gesture and/or touch-based inputs according to various embodiments is illustrated in FIGS. 2A, 2B, and 2C in which FIG. 2A is a perspective view of a gaming device 100 illustrating various physical features of the device, FIG. 2B is a functional block diagram that schematically illustrates an electronic relationship of various elements of the gaming device 100, and FIG. 2C illustrates various functional modules that can be stored in a memory device of the gaming device 100. The embodiments shown in FIGS. 2A to 2C are provided as examples for illustrative purposes only. It will be appreciated that gaming devices may come in many different shapes, sizes, layouts, form factors, and configurations, and with varying numbers and types of input and output devices, and that embodiments are not limited to the particular gaming device structures described herein.

Gaming devices 100 typically include a number of standard features, many of which are illustrated in FIGS. 2A and 2B. For example, referring to FIG. 2A, a gaming device 100 (which is an EGM 160 in this embodiment) may include a support structure, housing 105 (e.g., cabinet) which provides support for a plurality of displays, inputs, outputs, controls and other features that enable a player to interact with the gaming device 100.

The gaming device 100 illustrated in FIG. 2A includes a number of display devices, including a primary display device 116 located in a central portion of the housing 105 and a secondary display device 118 located in an upper portion of the housing 105. A plurality of game components 155 are displayed on a display screen 117 of the primary display device 116. It will be appreciated that one or more of the display devices 116, 118 may be omitted, or that the display devices 116, 118 may be combined into a single display device. The gaming device 100 may further include a player tracking display 142, a credit display 120, and a bet display 122. The credit display 120 displays a player's current number of credits, cash, account balance or the equivalent. The bet display 122 displays a player's amount wagered. Locations of these displays are merely illustrative as any of these displays may be located anywhere on the gaming device 100.

The player tracking display 142 may be used to display a service window that allows the player to interact with, for example, their player loyalty account to obtain features, bonuses, comps, etc. In other embodiments, additional display screens may be provided beyond those illustrated in FIG. 2A. In some embodiments, one or more of the player tracking display 142, the credit display 120 and the bet display 122 may be displayed in one or more portions of one or more other displays that display other game related visual content. For example, one or more of the player tracking display 142, the credit display 120 and the bet display 122 may be displayed in a picture in a picture on one or more displays.

The gaming device 100 may further include a number of input devices 130 that allow a player to provide various inputs to the gaming device 100, either before, during or after a game has been played. The gaming device may further include a game play initiation button 132 and a cashout button 134. The cashout button 134 is utilized to receive a cash payment or any other suitable form of payment corresponding to a quantity of remaining credits of a credit display.

In some embodiments, one or more input devices of the gaming device 100 are one or more game play activation devices that are each used to initiate a play of a game on the gaming device 100 or a sequence of events associated with the gaming device 100 following appropriate funding of the gaming device 100. The example gaming device 100 illustrated in FIGS. 2A and 2B includes a game play activation device in the form of a game play initiation button 132. It should be appreciated that, in other embodiments, the gaming device 100 begins game play automatically upon appropriate funding rather than upon utilization of the game play activation device.

In some embodiments, one or more input device 130 of the gaming device 100 may include wagering or betting functionality. For example, a maximum wagering or betting function may be provided that, when utilized, causes a maximum wager to be placed. Another such wagering or betting function is a repeat the bet device that, when utilized, causes the previously-placed wager to be placed. A further such wagering or betting function is a bet one function. A bet is placed upon utilization of the bet one function. The bet is increased by one credit each time the bet one device is utilized. Upon the utilization of the bet one function, a quantity of credits shown in a credit display (as described below) decreases by one, and a number of credits shown in a bet display (as described below) increases by one.

In some embodiments, as shown in FIG. 2B, the input device(s) 130 may include and/or interact with additional components, such as gesture sensors 156 for gesture input devices, and/or a touch-sensitive display that includes a digitizer 152 and a touchscreen controller 154 for touch input devices, as disclosed herein. The player may interact with the gaming device 100 by touching virtual buttons on one or more of the display devices 116, 118, 140. Accordingly, any of the above-described input devices, such as the input device 130, the game play initiation button 132 and/or the cashout button 134 may be provided as virtual buttons or regions on one or more of the display devices 116, 118, 140.

Referring briefly to FIG. 2B, operation of the primary display device 116, the secondary display device 118 and the player tracking display 142 may be controlled by a video controller 30 that receives video data from a processing circuit 12 or directly from a memory device 14 and displays the video data on the display screen. The credit display 120 and the bet display 122 are typically implemented as simple liquid crystal display (LCD) or light emitting diode (LED) displays that display a number of credits available for wagering and a number of credits being wagered on a particular game. Accordingly, the credit display 120 and the bet display 122 may be driven directly by the processing circuit 12. In some embodiments however, the credit display 120 and/or the bet display 122 may be driven by the video controller 30.

Referring again to FIG. 2A, the display devices 116, 118, 140 may include, without limitation: a cathode ray tube, a plasma display, an LCD, a display based on LEDs, a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display devices 116, 118, 140 may include a touch-screen with an associated touchscreen controller 154 and digitizer 152. The display devices 116, 118, 140 may be of any suitable size, shape, and/or configuration. The display devices 116, 118, 140 may include flat or curved display surfaces.

The display devices 116, 118, 140 and video controller 30 of the gaming device 100 are generally configured to display one or more game and/or non-game images, symbols, and indicia. In certain embodiments, the display devices 116, 118, 140 of the gaming device 100 are configured to display any suitable visual representation or exhibition of the movement of objects; dynamic lighting; video images; images of people, characters, places, things, and faces of cards; and the like. In certain embodiments, the display devices 116, 118, 140 of the gaming device 100 are configured to display one or more virtual reels, one or more virtual wheels, and/or one or more virtual dice. In other embodiments, certain of the displayed images, symbols, and indicia are in mechanical form. That is, in these embodiments, the display device 116, 118, 140 includes any electromechanical device, such as one or more rotatable wheels, one or more reels, and/or one or more dice, configured to display at least one or a plurality of game or other suitable images, symbols, or indicia.

The gaming device 100 also includes various features that enable a player to deposit credits in the gaming device 100 and withdraw credits from the gaming device 100, such as in the form of a payout of winnings, credits, etc. For example, the gaming device 100 may include a bill/ticket dispenser 136, a bill/ticket acceptor 128, and a coin acceptor 126 that allows the player to deposit coins into the gaming device 100.

As illustrated in FIG. 2A, the gaming device 100 may also include a currency dispenser 137 that may include a note dispenser configured to dispense paper currency and/or a coin generator configured to dispense coins or tokens in a coin payout tray.

The gaming device 100 may further include one or more speakers 150 controlled by one or more sound cards 28 (FIG. 2B). The gaming device 100 illustrated in FIG. 2A includes a pair of speakers 150. In other embodiments, additional speakers, such as surround sound speakers, may be provided within or on the housing 105. Moreover, the gaming device 100 may include built-in seating with integrated headrest speakers.

In various embodiments, the gaming device 100 may generate dynamic sounds coupled with attractive multimedia images displayed on one or more of the display devices 116, 118, 140 to provide an audio-visual representation or to otherwise display full-motion video with sound to attract players to the gaming device 100 and/or to engage the player during gameplay. In certain embodiments, the gaming device 100 may display a sequence of audio and/or visual attraction messages during idle periods to attract potential players to the gaming device 100. The videos may be customized to provide any appropriate information.

The gaming device 100 may further include a card reader 138 that is configured to read magnetic stripe cards, such as player loyalty/tracking cards, chip cards, and the like. In some embodiments, a player may insert an identification card into a card reader of the gaming device. In some embodiments, the identification card is a smart card having a programmed microchip or a magnetic strip coded with a player's identification, credit totals (or related data) and other relevant information. In other embodiments, a player may carry a portable device, such as a cell phone, a radio frequency identification tag or any other suitable wireless device, which communicates a player's identification, credit totals (or related data) and other relevant information to the gaming device. In some embodiments, money may be transferred to a gaming device through electronic funds transfer. When a player funds the gaming device, the processing circuit determines the amount of funds entered and displays the corresponding amount on the credit or other suitable display as described above.

In some embodiments, the gaming device 100 may include an electronic payout device or module configured to fund an electronically recordable identification card or smart card or a bank or other account via an electronic funds transfer to or from the gaming device 100.

FIG. 2B is a block diagram that illustrates logical and functional relationships between various components of a gaming device 100. It should also be understood that components described in FIG. 2B may also be used in other computing devices, as desired, such as mobile computing devices, personal computers, lottery terminals, or other network-connected devices, for example. As shown in FIG. 2B, the gaming device 100 may include a processing circuit 12 that controls operations of the gaming device 100. Although illustrated as a single processing circuit, multiple special purpose and/or general purpose processors and/or processor cores may be provided in the gaming device 100. For example, the gaming device 100 may include one or more of a video processor, a signal processor, a sound processor and/or a communication controller that performs one or more control functions within the gaming device 100. The processing circuit 12 may be variously referred to as a "controller," "microcontroller," "microprocessor" or simply a "computer." The processor may further include one or more application-specific integrated circuits (ASICs).

Various components of the gaming device 100 are illustrated in FIG. 2B as being connected to the processing circuit 12. It will be appreciated that the components may be connected to the processing circuit 12 through a system bus 151, a communication bus and controller, such as a universal serial bus (USB) controller and USB bus, a network interface, or any other suitable type of connection.

The gaming device 100 further includes a memory device 14 that stores one or more functional modules 20. Various functional modules 20 of the gaming device 100 will be described in more detail below in connection with FIG. 2D.

The memory device 14 may store program code and instructions, executable by the processing circuit 12, to control the gaming device 100. The memory device 14 may also store other data such as image data, event data, player input data, random or pseudo-random number generators, pay-table data or information and applicable game rules that relate to the play of the gaming device. The memory device 14 may include random access memory (RAM), which can include non-volatile RAM (NVRAM), magnetic RAM (ARAM), ferroelectric RAM (FeRAM) and other forms as commonly understood in the gaming industry. In some embodiments, the memory device 14 may include read only memory (ROM). In some embodiments, the memory device 14 may include flash memory and/or EEPROM (electrically erasable programmable read only memory). Any other suitable magnetic, optical and/or semiconductor memory may operate in conjunction with the gaming device disclosed herein.

The gaming device 100 may further include a data storage 22, such as a hard disk drive or flash memory. The data storage 22 may store program data, player data, audit trail data or any other type of data. The data storage 22 may include a detachable or removable memory device, including, but not limited to, a suitable cartridge, disk, CD ROM, Digital Video Disc ("DVD") or USB memory device.

The gaming device 100 may include a communication adapter 26 that enables the gaming device 100 to communicate with remote devices over a wired and/or wireless communication network, such as a local area network (LAN), wide area network (WAN), cellular communication network, or other data communication network. The communication adapter 26 may further include circuitry for supporting short range wireless communication protocols, such as Bluetooth and/or NFC that enable the gaming device 100 to communicate, for example, with a mobile communication device operated by a player.

The gaming device 100 may include one or more internal or external communication ports that enable the processing circuit 12 to communicate with and to operate with internal or external peripheral devices, such as eye tracking devices, position tracking devices, cameras, accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, Small Computer System Interface ("SCSI") ports, solenoids, speakers, thumb drives, ticket readers, touch screens, trackballs, touchpads, wheels, and wireless communication devices. In some embodiments, internal or external peripheral devices may communicate with the processing circuit through a USB hub (not shown) connected to the processing circuit 12.

In some embodiments, the gaming device 100 may include a sensor, such as a camera 127, in communication with the processing circuit 12 (and possibly controlled by the processing circuit 12) that is selectively positioned to acquire an image of a player actively using the gaming device 100 and/or the surrounding area of the gaming device 100. In one embodiment, the camera 127 may be configured to selectively acquire still or moving (e.g., video) images and may be configured to acquire the images in either an analog, digital or other suitable format. The display devices 116, 118, 140 may be configured to display the image acquired by the camera 127 as well as display the visible manifestation of the game in split screen or picture-in-picture fashion. For example, the camera 127 may acquire an image of the player and the processing circuit 12 may incorporate that image into the primary and/or secondary game as a game image, symbol or indicia.

Various functional modules of that may be stored in a memory device 14 of a gaming device 100 are illustrated in FIG. 2C. Referring to FIG. 2C, the gaming device 100 may include in the memory device 14 a game module 20A that includes program instructions and/or data for operating a hybrid wagering game as described herein. The gaming device 100 may further include a player tracking module 20B, an electronic funds transfer module 20C, an input device interface 20D, an audit/reporting module 20E, a communication module 20F, an operating system kernel 20G and a random number generator 20H. The player tracking module 20B keeps track of the play of a player. The electronic funds transfer module 20C communicates with a back end server or financial institution to transfer funds to and from an account associated with the player. The input device interface 20D interacts with input devices, such as the input device 130, as described in more detail below. The communication module 20F enables the gaming device 100 to communicate with remote servers and other gaming devices using various secure communication interfaces. The operating system kernel 20G controls the overall operation of the gaming device 100, including the loading and operation of other modules. The random number generator 20H generates random or pseudorandom numbers for use in the operation of the hybrid games described herein.

In some embodiments, a gaming device 100 includes a personal device, such as a desktop computer, a laptop computer, a mobile device, a tablet computer or computing device, a personal digital assistant (PDA), or other portable computing devices. In some embodiments, the gaming device 100 may be operable over a wireless network, such as part of a wireless gaming system. In such embodiments, the gaming machine may be a hand-held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission.

Figure 2D:
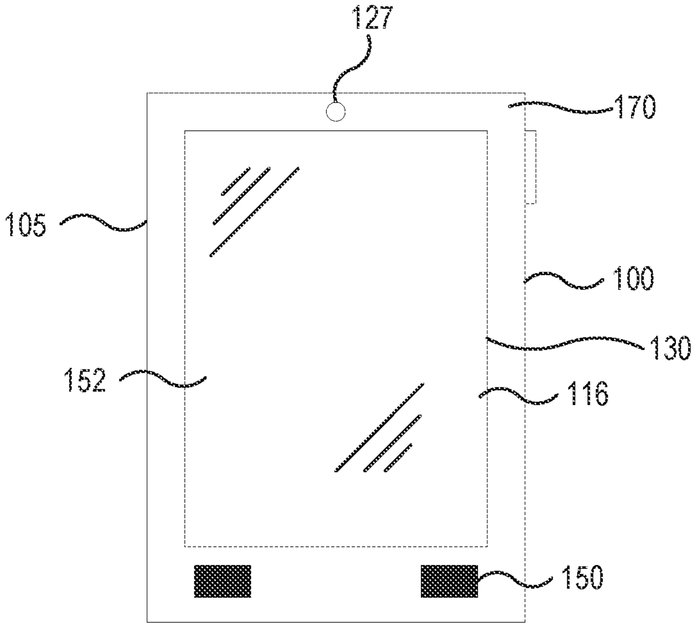
FIG. 2D is perspective view of a gaming device that can be configured according to some embodiments.

For example, referring to FIG. 2D, a gaming device 100 (which is a mobile gaming device 170 in this embodiment) may be implemented as a handheld device including a compact housing 105 on which is mounted a touchscreen display device 116 including a digitizer 152. One or more input devices 130 may also be included for providing functionality of for embodiments described herein. A camera 127 may be provided in a front face of the housing 105. The housing 105 may include one or more speakers 150. In the gaming device 100, various input buttons described above, such as the cashout button, gameplay activation button, etc., may be implemented as soft buttons on the touchscreen display device 116 and/or input device 130. In this embodiment, the input device 130 is integrated into the touchscreen display device 116, but it should be understood that the input device may also, or alternatively, be separate from the display device 116. Moreover, the gaming device 100 may omit certain features, such as a bill acceptor, a ticket generator, a coin acceptor or dispenser, a card reader, secondary displays, a bet display, a credit display, etc. Credits can be deposited in or transferred from the gaming device 100 electronically.

Figure 2E:
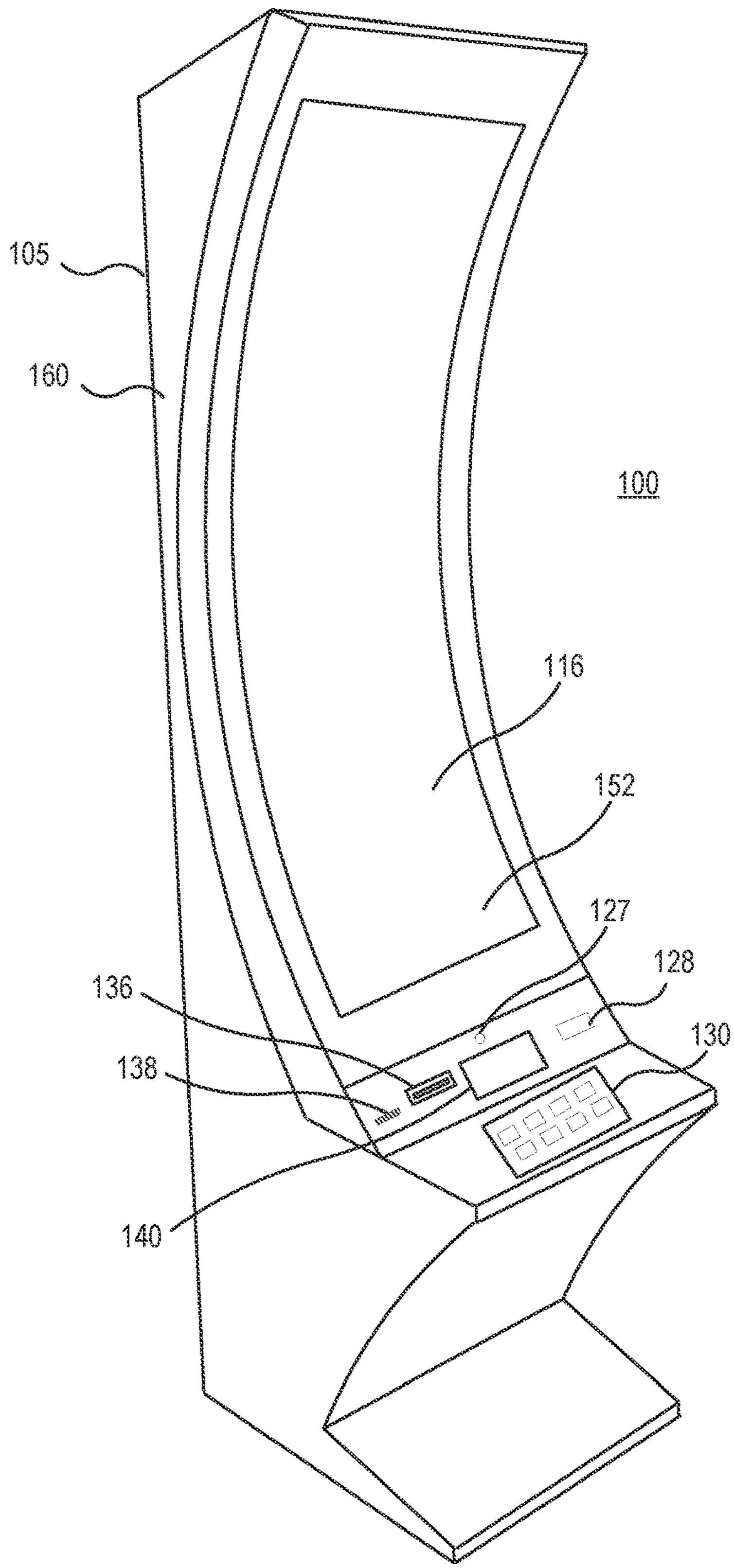
FIG. 2E is a perspective view of a gaming device according to further embodiments.

FIG. 2E illustrates a standalone gaming device 100 (which is an EGM 160 in this embodiment) having a different form factor from the EGM 160 illustrated in FIG. 2A. In particular, the gaming device 100 is characterized by having a large, high aspect ratio, curved primary display device 116 provided in the housing 105, with no secondary display device. The primary display device 116 may include a digitizer 152 to allow touchscreen interaction with the primary display device 116. The gaming device 100 may further include a player tracking display 142, an input device 130, a bill/ticket acceptor 128, a card reader 138, and a bill/ticket dispenser 136. The gaming device 100 may further include one or more cameras 127 to enable facial recognition and/or motion tracking.

Although illustrated as certain gaming devices, such as electronic gaming machines (EGMs) and mobile gaming devices, functions and/or operations as described herein may also include wagering stations that may include electronic game tables, conventional game tables including those involving cards, dice and/or roulette, and/or other wagering stations such as sports book stations, video poker games, skill-based games, virtual casino-style table games, or other casino or non-casino style games. Further, gaming devices according to embodiments herein may be implemented using other computing devices and mobile devices, such as smart phones, tablets, and/or personal computers, among others.

Figure 3:
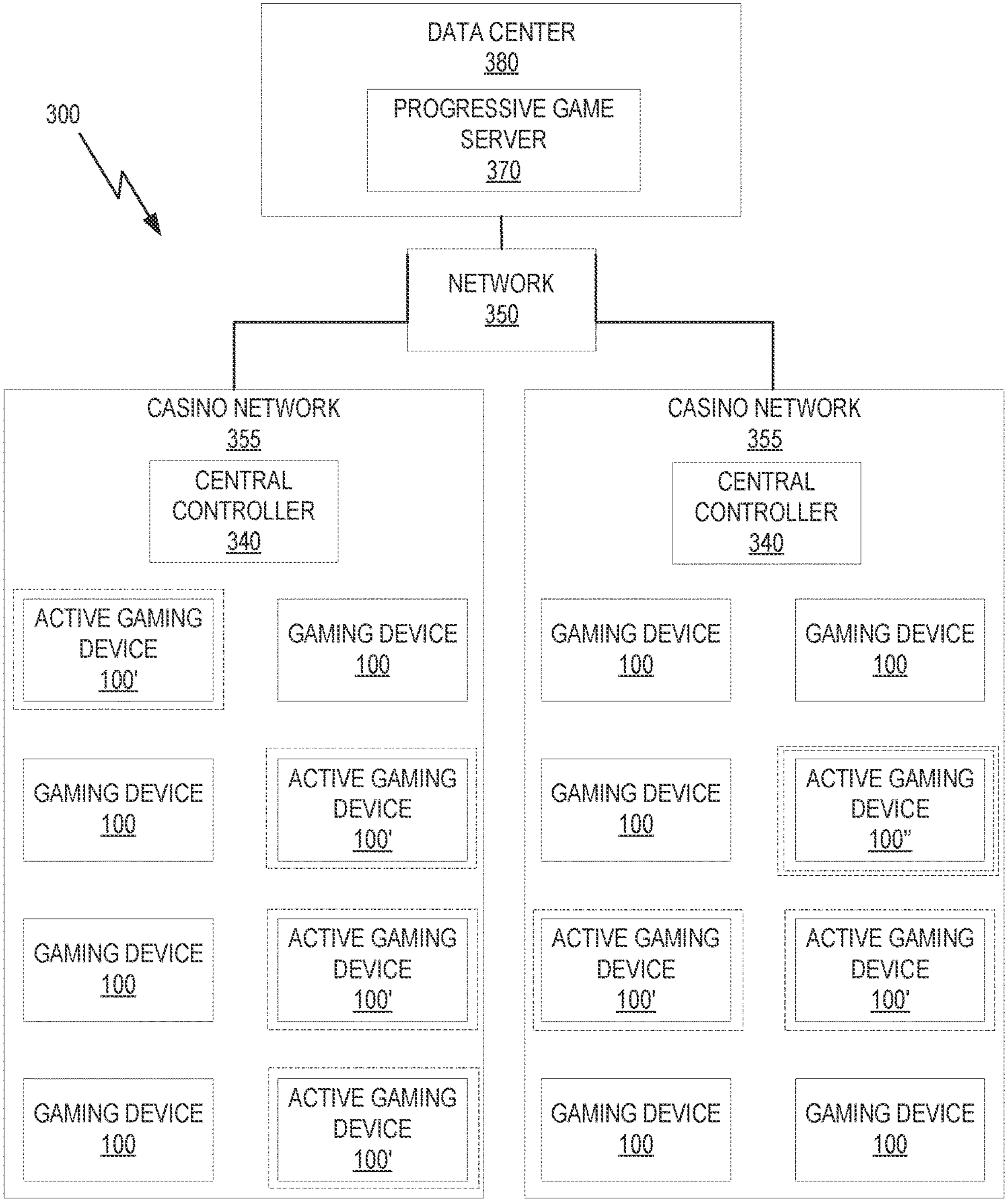
FIG. 3 is a schematic block diagram illustrating a network configuration for a plurality of electronic gaming machines (EGMs) according to some embodiments.

Referring now to FIG. 3, a schematic block diagram illustrates a network configuration for a plurality of gaming devices 100 according to some embodiments. In this example, the gaming devices 100 include a plurality of electronic gaming machines (EGMs), but it should be understood that other types and combinations of gaming devices 100 may be used. A system 300, which may include some or all of the components of gaming system 10 of FIG. 1 in some embodiments, includes a plurality of casino networks 355 interconnected with each other and a data center 380 through a data communication network 350 similar to the data communication network 50 of FIG. 1. Each casino network 355 may include a central controller 340, similar to the central controller 40 of FIG. 1, that manages a plurality of gaming devices 100 on the casino network 355. In this example, the data center 380 includes a progressive game server 370 similar to the progressive game server 70 of FIG. 1.

The progressive game server 370 determines when a winning condition for a WAP or other progressive game has been satisfied for one or more winning gaming devices 100". A plurality of wagers associated with the wide-area progressive wagering game are received at the plurality of eligible gaming devices 100 over time, and the system 300 allocates a first portion of each wager to a primary progressive award pool and a second portion of each wager to a secondary progressive award pool.

The progressive game server 370 next determines a subset of active gaming devices 100' of the plurality of eligible gaming devices 100, which include all the gaming devices 100 on both casino networks 355 in this example. In this example, each active gaming device 100' is determined based on whether the gaming device 100 has a current active gaming session.

In this example, the eligible gaming devices 100 are a plurality of EGMs on the plurality of casino networks 355, but it should be understood that other types of gaming devices may be used as part of the WAP, instead of or in combination with the EGMs of FIG. 3, such as mobile gaming devices for example. In another embodiment, for example, the gaming devices 100 may include lottery terminals or mobile lottery devices.

Determining the subset of active gaming devices 100' may be accomplished in a number of different ways. For example, an eligible gaming device 100 may be determined to be an active gaming device 100' based on the gaming device meeting a predetermined activity condition, which may be indicative of the gaming device having a current active gaming session. In one example, the progressive game server 370 may transmit a message to each eligible gaming device 100 containing instructions that cause each gaming device 100 to determine whether the gaming device 100 meets a predetermined activity condition and transmit a responsive message to the progressive game server 370 containing an indication of whether the gaming device 100 meets the predetermined activity condition. Based on the responsive messages containing such indications, the progressive game server 370 can then determine that the respective gaming device 100 is part of the subset of active gaming devices 100'.

In this embodiment, the subset of active gaming devices 100' includes all of the eligible gaming devices 100 that meet the predetermined activity condition, but it should be understood that the subset of active gaming device 100' may include a smaller subset, as desired. For example, in this example, some or all of the secondary award pool may be divided equally among all active gaming devices 100' without regard to the total size of each individual secondary award amount. In another example, different secondary award amounts may be paid to different active gaming devices 100' based on various criteria, such as a player status of a player of the active gaming device 100', wagering amount and/or rate, etc., as desired. In another example, a minimum secondary award amount may be determined, with the secondary award being paid out only in response to the secondary award pool being sufficiently large to pay out at least the minimum secondary award payout to all of the determined active gaming devices 100'. In another example, the number of gaming devices 100 in the subset of active gaming devices 100' may be capped based on the predetermined minimum secondary award amount, so that a larger award is provided to a smaller number of active gaming devices 100'.

The predetermined activity condition may include any number of different criteria. For example, in some embodiments, the predetermined activity condition includes a minimum wagering amount at the respective gaming device 100. This minimum wagering amount can be based on a total amount wagered at the gaming device 100 over a predetermined period of time, a total amount wagered by a current player of the gaming device 100, e.g., at the gaming machine, at the casino and/or affiliated casinos, and/or within a predetermined time period. The predetermined activity condition may also include a wager placed at the respective gaming device 100 within a predetermined amount of time, e.g., an indication that the gaming device 100 was used recently enough to be considered to have a current active gaming session. The predetermined activity condition may also include an active credit meter balance, e.g., a non-cashed credit balance that is available for wagering at the gaming device 100. The predetermined activity condition may also include a minimum wagering rate at the respective gaming device 100, e.g., based on wagers being placed at the gaming device 100 at a minimum rate and/or denomination. The predetermined activity condition may also include a wager placed by a registered player associated with the WAP, e.g., by a player that has provided identification in the form of a player's card or other indication that the player is registered and/or rated.

The progressive game server 370 next provides a primary progressive award to a user of the one or more winning gaming devices 100" associated with the winning condition. In this example, the progressive game server 370 may transmit a message to the winning gaming device 100" instructing the winning gaming device 100" to provide some or all of the primary progressive award pool to the player at the winning gaming device 100". The progressive game server 370 also provides a secondary progressive award, which may also be referred to as a celebration award or bonus, or a participation award or bonus, to each active gaming device 100' as well. Here again, the progressive game server 370 may transmit a message to each active gaming device 100' instructing the winning gaming device 100" to provide a portion of the secondary progressive award pool to each player at each of the subset of active gaming devices 100' associated with the active gaming session. In other embodiments, the primary progressive award and/or the secondary progressive award may be provided by the progressive game server 370. The secondary progressive award may be provided as cash (e.g., dispensed from a dispenser of the active gaming device 100'), or as a bearer instrument having a monetary value (e.g., a redeemable printed ticket) in some embodiments. For example, the printed ticket may be printed by a gaming device 100' and/or kiosk, e.g., an EGM, lottery terminal, ATM, vending machine, etc., and may be redeemed by inserting the ticket into the same or another gaming device 100 and/or kiosk. The ticket may be redeemed for monetary (e.g., cash) and/or non-monetary (e.g., merchandise, entry into another wagering game, instant win/scratch off lottery tickets etc.) awards, as desired. In some embodiments, the secondary progressive award may be provided as an increase of a credit meter balance for the active gaming session of the active gaming device 100'. In some embodiments, some or all of the celebration award may be provided to a third party, e.g., a charitable or professional organization, for example to build goodwill and/or provide an additional incentive to the player of the WAP.

Figure 4A:
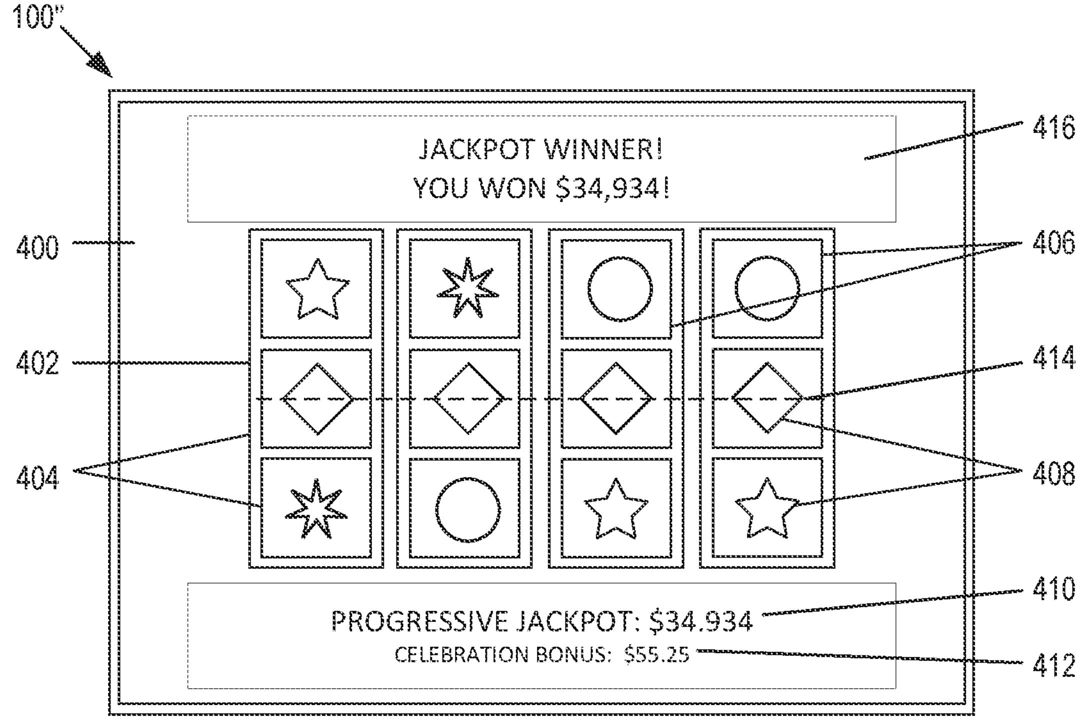
FIGS. 4A-4B illustrate graphical user interfaces (GUIs) for providing a wide area progressive (WAP) game and providing a primary award and a secondary monetary award.
Figure 4B:
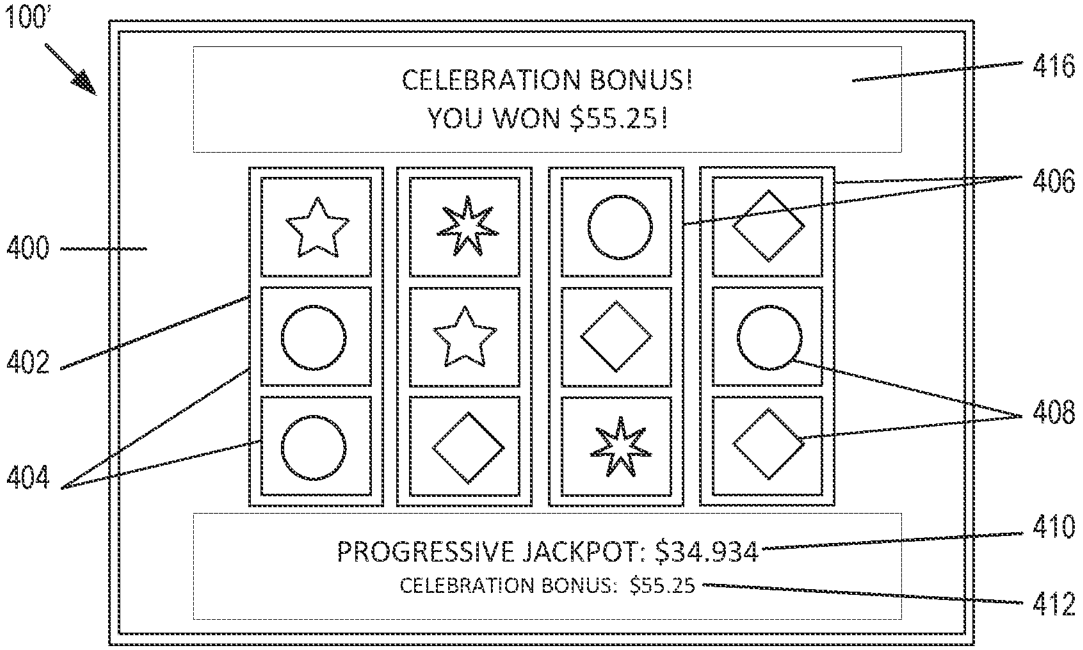

FIGS. 4A-4B illustrate graphical user interfaces (GUIs) 400 for providing a WAP game and providing a primary award and a secondary monetary award at a plurality of gaming devices 100. In this example, the GUI 400 is for a slot-style wagering game 402 at an EGM, but it should be understood that other types of wagering games on various types of gaming devices may also be provided. In this example, the GUI 400 of the wagering game 402 includes a plurality of gaming elements 404, including slot reels 406 each having a plurality of slot symbols 408. The GUI 400 also includes an indication of a current value for a primary progressive award 410 (e.g., $34,934 progressive jackpot) and a current value for a secondary progressive award 412 (e.g., $55.25 celebration bonus) for the WAP game.

As shown in FIG. 4A, the GUI 400 at a winning gaming device 100" indicates a winning game result 414, which meets the winning condition for the WAP game, which in turn causes the primary progressive award 410 to be awarded to the player of the winning gaming device 100". The GUI 400 of the winning gaming device 100" also displays an indication 416 that the primary progressive award 410 has been awarded.

At the same time, as shown by FIG. 4B, the GUI 400 of each active gaming device 100' that is part of the WAP game network displays an indication 418 that active gaming device 100' qualifies for the secondary progressive award 412.

In the above examples of FIGS. 3-4B, the subset of active gaming devices 100' includes every eligible active gaming device 100' at the time the primary progressive award is awarded. It should be understood, however, that it may be desirable to limit the number of secondary progressive awards, for example to maintain a predetermined minimum secondary progressive award value, or to account for a limited inventory of non-monetary secondary progressive awards.

Figure 5:
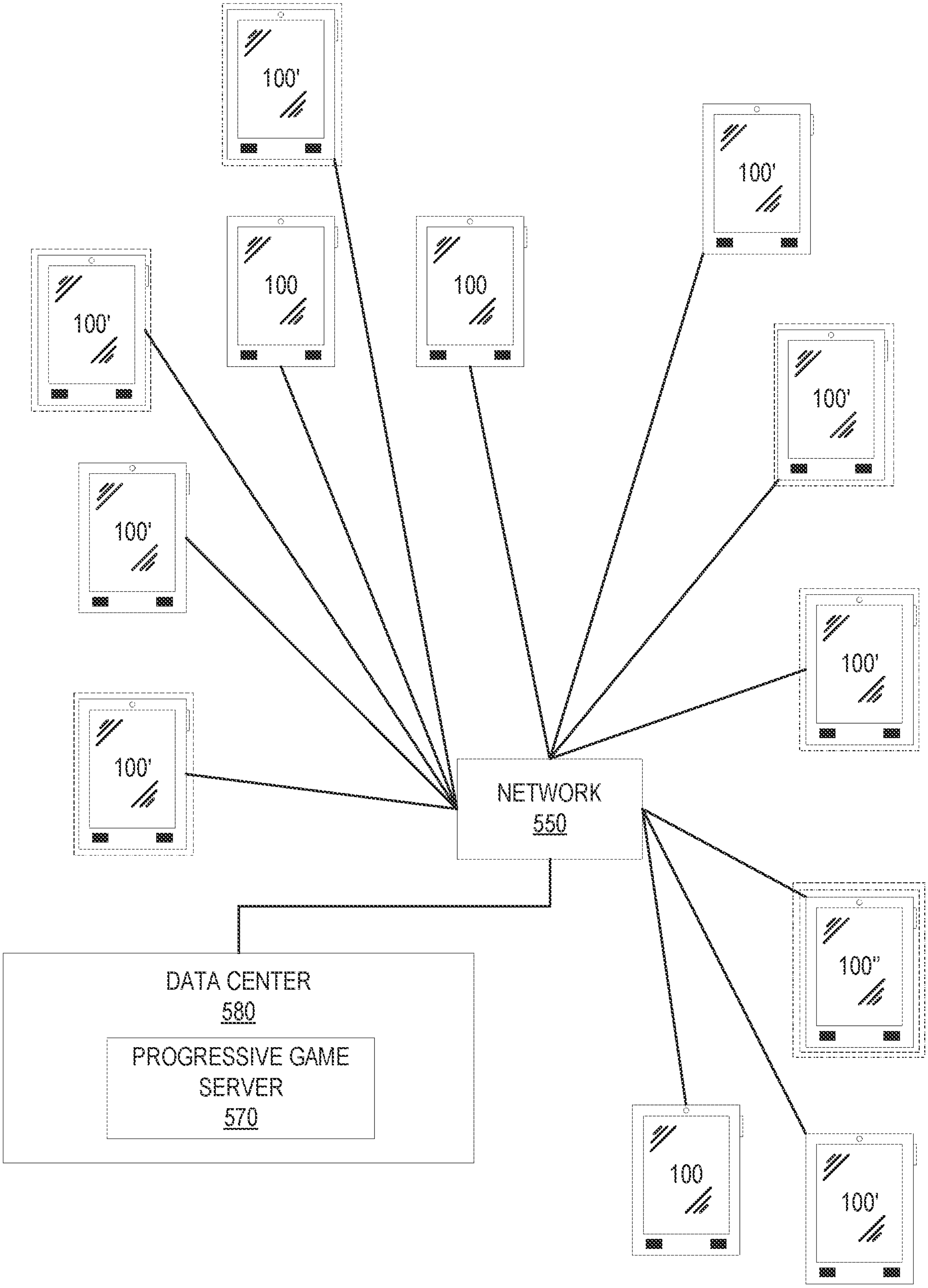
FIG. 5 is a schematic block diagram illustrating a network configuration for a plurality of mobile gaming devices according to some embodiments.

In this regard, FIG. 5 illustrates a schematic block diagram of a network configuration for a plurality of gaming devices 100 according to some embodiments. In this example, the gaming devices 100 are mobile gaming devices, but it should be understood that any number or combination of gaming devices and/or gaming device types may be used.

A system 500, which may include some or all of the components of gaming system 10 of FIG. 1 and/or system 300 of FIG. 3 in some embodiments, includes a plurality of mobile gaming devices 100 interconnected with each other and a data center 580 through a data communication network 550 similar to the data communication network 50 of FIG. 1 and/or the data communication network 350 of FIG. 3. In this example, the data center 580 includes a progressive game server 570 similar to the progressive game server 70 of FIG. 1 and/or the progressive game server 370 of FIG. 3.

In this example, the primary progressive award is awarded to a winning gaming device 100" as discussed above. Here, however, a smaller subset 502 of active gaming devices 100' is determined based on an available number of limited inventory secondary progressive awards. In this example, twelve gaming devices 100 are illustrated, with nine of the gaming devices 100 being active gaming devices 100' (including the winning gaming device 100"). In this example, the secondary progressive award is one of five available autographed guitars, but it should be understood that any type of secondary award may be provided in this manner, including non-inventory limited awards, as desired. In this example, a number of available secondary progressive awards is determined, with the smaller subset 502 of active gaming devices 100' including a number of active gaming devices 100' that does not exceed the number of available secondary progressive awards.

In this example, a smaller subset 502 of five active gaming devices 100' is determined based on any number or combination of criteria, including a ranking of amounts and/or categories of game activity, random or semi-random selection, or any other selection method, as desired.

Figure 6A:
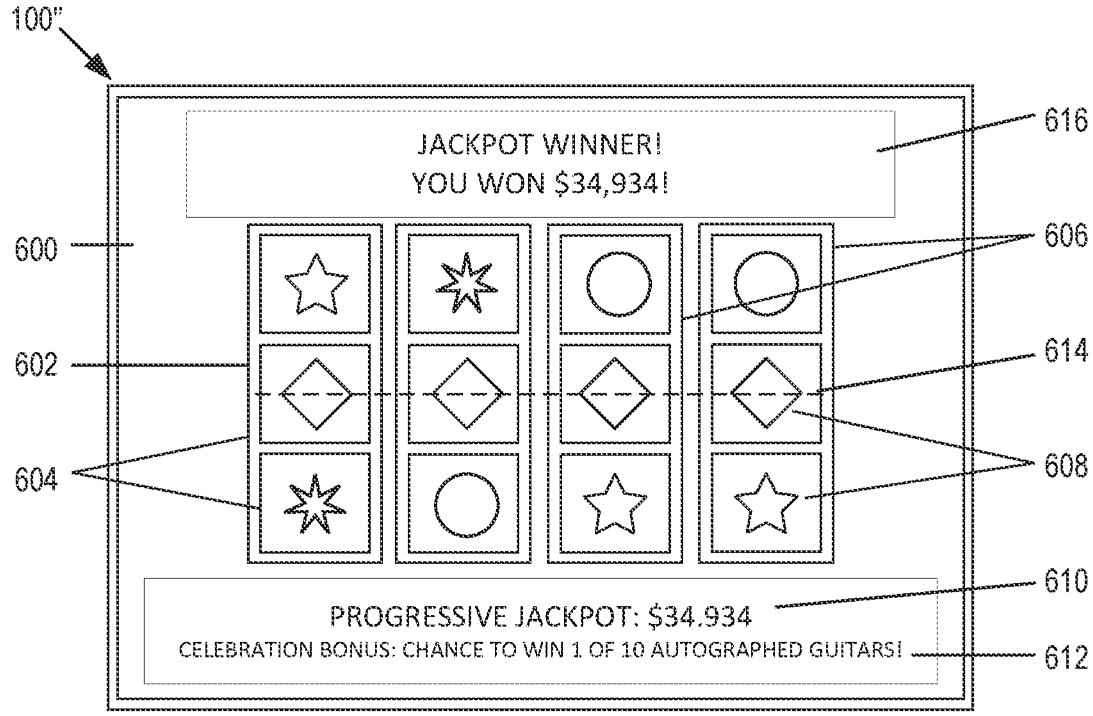
FIGS. 6A-6B illustrate graphical user interfaces (GUIs) for providing a wide area progressive (WAP) game and providing a primary award and a secondary limited-inventory non-monetary award.
Figure 6B:
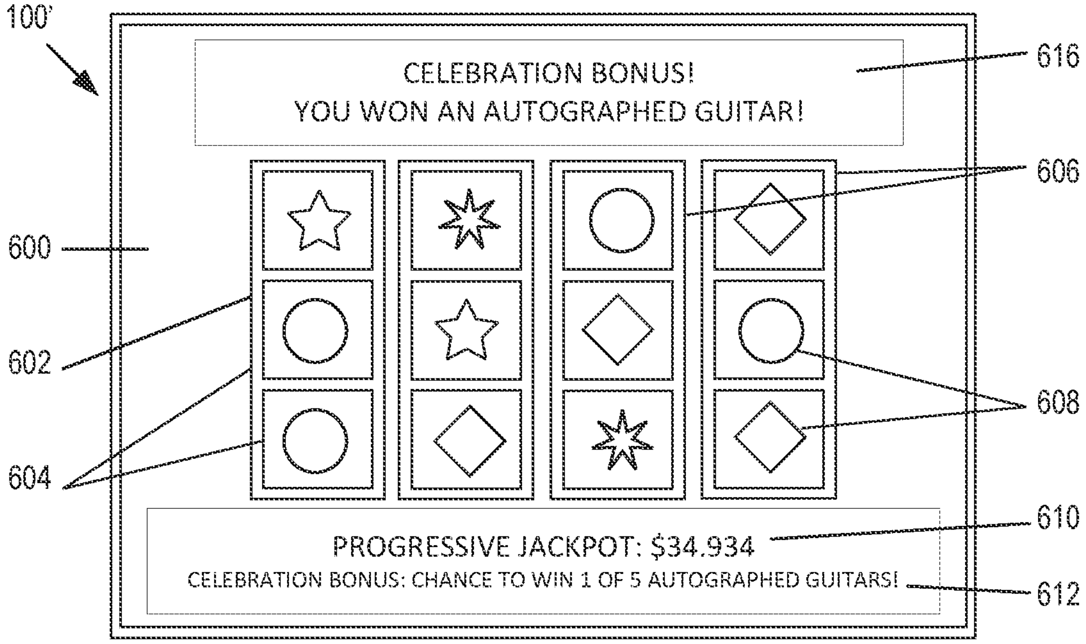

Referring now to FIGS. 6A-6B, graphical user interfaces (GUIs) 600 for providing a wide area progressive (WAP) game and providing a primary award and a secondary limited-inventory non-monetary award are illustrated. In this example, the GUI 600 is for a slot-style wagering game 602 on a mobile, but it should be understood that other types of wagering games on various types of gaming devices may also be provided. In this example, the GUI 600 of the wagering game 602 includes a plurality of gaming elements 604, including slot reels 606 each having a plurality of slot symbols 608. The GUI 600 also includes an indication of a current value for a primary progressive award 610 (e.g., $34,934 progressive jackpot) and a current value for a secondary progressive award 612 (e.g., 1 of 5 autographed guitars) for the WAP game.

As shown in FIG. 6A, the GUI 600 at a winning gaming device 100" indicates a winning game result 614, which meets the winning condition for the WAP game, which in turn causes the primary progressive award 610 to be awarded to the player of the winning gaming device 100". The GUI 600 of the winning gaming device 100" also displays an indication 616 that the primary progressive award 610 has been awarded. At the same time, as shown by FIG. 6B, the GUI 600 of each of the smaller subset (e.g., smaller subset 502 of FIG. 5) of active gaming device 100' displays an indication 618 that active gaming device 100' qualifies for the secondary progressive award 612.

Figure 7:
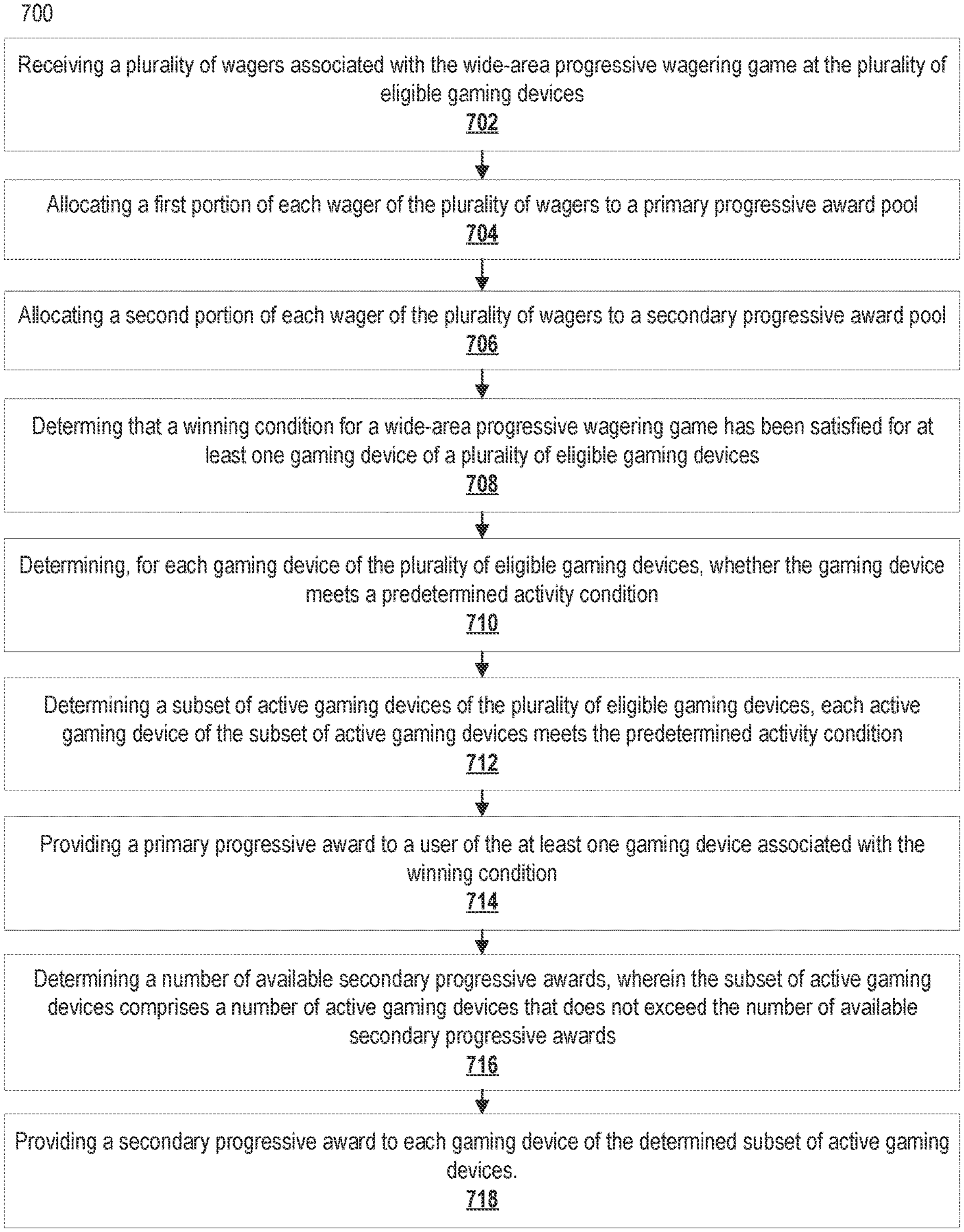
FIG. 7 is a flowchart illustrating operations of systems/methods of facilitating play of a progressive game having primary and secondary awards, according to some embodiments.

FIG. 7 is a flowchart illustrating operations 700 of systems/methods for facilitating embodiments described herein. The operations 700 may include receiving a plurality of wagers associated with the wide-area progressive wagering game at the plurality of eligible gaming devices (Block 702). For example, in some embodiments, a wager may be received at any of the gaming devices 100 of FIGS. 1-6B or another gaming device 100, for example via input devices 130, game play initiation button 132, touchscreen display device 116, etc., as described above with respect to FIGS. 2A-2E et al.

The operations 700 may further include allocating a first portion of each wager of the plurality of wagers to a primary progressive award pool (Block 704). For example, in the embodiments of FIGS. 3-6B, a portion of each received wager at each eligible gaming device 100 may be allocated to the primary progressive award pool to be paid out as a primary progressive award to a winning gaming device 100" (e.g., primary progressive award 410 of FIGS. 4A-4B and/or primary progressive award 610 of FIGS. 6A-6B).

The operations 700 may further include allocating a second portion of each wager of the plurality of wagers to a secondary progressive award pool (Block 706). For example, in the embodiments of FIGS. 3-6B, a portion of each received wager at each eligible gaming device 100 may be allocated to the secondary progressive award pool to be paid out as a secondary progressive award to a subset of active gaming devices 100' (e.g., secondary progressive award 412 of FIGS. 4A-4B and/or secondary progressive award 612 of FIGS. 6A-6B).

The operations 700 may further include determining that a winning condition for a wide-area progressive wagering game has been satisfied for at least one gaming device of a plurality of eligible gaming devices (Block 708). For example, in the embodiments of FIGS. 4A-4B and 6A-6B, a winning game result 414, 614 may meet the winning condition for the WAP game.

The operations 700 may further include determining, for each gaming device of the plurality of eligible gaming devices, whether the gaming device meets a predetermined activity condition (Block 710). For example, in the embodiments of FIGS. 3-6B, for every eligible gaming device 100, a determination is made whether the gaming device 100 meets a predetermined activity condition, such as a minimum wagering amount at the respective gaming device 100, a total amount wagered at the gaming device 100 over a predetermined period of time, a total amount wagered by a current player of the gaming device 100, a wager placed at the respective gaming device 100 within a predetermined amount of time, an active credit meter balance, a minimum wagering rate at the respective gaming device 100, a wager placed by a registered player, and/or any other criteria.

The operations 700 may further include determining a subset of active gaming devices of the plurality of eligible gaming devices, each active gaming device of the subset of active gaming devices meets the predetermined activity condition (Block 712). For example, in the example of FIGS. 3-4B, all of the eligible active gaming devices 100' may be included in the subset of active gaming devices 100', with each active gaming device 100' receiving a portion of the secondary progressive award 412. In the example of FIGS. 5-6B, a smaller subset 502 of active gaming devices 100' may be determined, for example, based on an availability of a limited inventory secondary progressive award 612.

The operations 700 may further include providing a primary progressive award to a user of the at least one gaming device associated with the winning condition (Block 714). For example, as shown in FIGS. 4A and 6A, a primary progressive award 410, 610 may be provided to a winning gaming device 100" based on a winning game result 414, 614.

The operations 700 may further include determining a number of available secondary progressive awards, wherein the subset of active gaming devices includes a number of active gaming devices that does not exceed the number of available secondary progressive awards (Block 716). For example, as discussed above, the example of FIGS. 5-6B includes determining a smaller subset 502 of active gaming devices 100' based on an availability of a limited inventory secondary progressive award 612. In another example, a smaller subset of active gaming devices 100' may be determined based on a minimum secondary progressive award value, with the secondary progressive award pool being divided among the smaller subset.

The operations 700 may further include providing a secondary progressive award to each gaming device of the determined subset of active gaming devices (Block 718). For example, as shown in FIGS. 4B and 6B, a secondary progressive award 412, 612 may be provided to active gaming devices 100' in response to the winning game result 414, 614 and award of the primary progressive award 410, 610.

Embodiments described herein may be implemented in various configurations for gaming devices 100, including but not limited to: (1) a dedicated gaming device, wherein the computerized instructions for controlling any games (which are provided by the gaming device) are provided with the gaming device prior to delivery to a gaming establishment; and (2) a changeable gaming device, where the computerized instructions for controlling any games (which are provided by the gaming device) are downloadable to the gaming device through a data network when the gaming device is in a gaming establishment. In some embodiments, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In some embodiments, a gaming device may be operated by a mobile device, such as a mobile telephone, tablet other mobile computing device. For example, a mobile device may be communicatively coupled to a gaming device and may include a user interface that receives user inputs that are received to control the gaming device. The user inputs may be received by the gaming device via the mobile device.

In some embodiments, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more gaming devices; and/or (c) one or more personal gaming devices, such as desktop computers, laptop computers, tablet computers or computing devices, PDAs, mobile telephones such as smart phones, and other mobile computing devices.

In certain such embodiments, computerized instructions for controlling any games (such as any primary or base games and/or any secondary or bonus games) displayed by the gaming device are executed by the central server, central controller, or remote host. In such "thin client" embodiments, the central server, central controller, or remote host remotely controls any games (or other suitable interfaces) displayed by the gaming device, and the gaming device is utilized to display such games (or suitable interfaces) and to receive one or more inputs or commands. In other such embodiments, computerized instructions for controlling any games displayed by the gaming device are communicated from the central server, central controller, or remote host to the gaming device and are stored in at least one memory device of the gaming device. In such "thick client" embodiments, the at least one processor of the gaming device executes the computerized instructions to control any games (or other suitable interfaces) displayed by the gaming device.

In some embodiments in which the gaming system includes: (a) a gaming device configured to communicate with a central server, central controller, or remote host through a data network; and/or (b) a plurality of gaming devices configured to communicate with one another through a data network, the data network is an internet or an intranet. In certain such embodiments, an internet browser of the gaming device is usable to access an internet game page from any location where an internet connection is available.

In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the gaming device, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the gaming device.

It should be appreciated that the central server, central controller, or remote host and the gaming device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of gaming devices to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

In the above-description of various embodiments, various aspects may be illustrated and described herein in any of a number of patentable classes or contexts including any new and useful process, machine, manufacture, or composition of matter, or any new and useful improvement thereof. Accordingly, various embodiments described herein may be implemented entirely by hardware, entirely by software (including firmware, resident software, micro-code, etc.) or by combining software and hardware implementation that may all generally be referred to herein as a "circuit," "module," "component," or "system." Furthermore, various embodiments described herein may take the form of a computer program product including one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio frequency ("RF"), etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, Common Business Oriented Language ("COBOL") 2002, PHP: Hypertext Processor ("PHP"), Advanced Business Application Programming ("ABAP"), dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Various embodiments were described herein with reference to flowchart illustrations and/or block diagrams of methods, apparatus (systems), devices and computer program products according to various embodiments described herein. It will be understood that each block of the flowchart illustrations and/or block diagrams, and combinations of blocks in the flowchart illustrations and/or block diagrams, can be implemented by computer program instructions. These computer program instructions may be provided to a processing circuit of a general purpose computer, special purpose computer, or other programmable data processing apparatus to produce a machine, such that the instructions, which execute via the processing circuit of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operations to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A system comprising:

a processor circuit; and a memory comprising machine-readable instructions that, when executed by the processor circuit, cause the processor circuit to:

determine that a winning condition for a wide-area progressive wagering game has been satisfied for a gaming device of a plurality of eligible gaming devices;

determine a number of available secondary progressive awards;

transmit a message to each gaming device of the plurality of eligible gaming devices, the message comprising instructions that cause the gaming device to:

determine whether the gaming device meets a predetermined activity condition; and transmit a responsive message comprising an indication of whether the gaming device meets the predetermined activity condition; and select a subset of responsive messages that contains an indication that the respective gaming device meets the predetermined activity condition, wherein a number of responsive messages in the subset does not exceed the number of available secondary progressive awards;

for each responsive message in the subset of responsive messages, determine that the respective gaming device is part of a subset of active gaming devices of the plurality of eligible gaming devices, such that each active gaming device of the subset of active gaming devices comprises an active gaming session associated with a user of the active gaming device;

provide a primary progressive award to a user of the gaming device associated with the winning condition; and cause each gaming device of the determined subset of active gaming devices to dispense a secondary progressive award comprising a non-monetary award.

2. The system of claim 1, wherein the secondary progressive award comprises a limited inventory merchandise item.

3. The system of claim 1, wherein the secondary progressive award further comprises a monetary value.

4. The system of claim 3, wherein the machine-readable instructions further cause the processor circuit to:

receive a plurality of wagers associated with the wide-area progressive wagering game at the plurality of eligible gaming devices;

allocate a first portion of each wager of the plurality of wagers to a primary progressive award pool, wherein the instructions to provide the primary progressive award cause the processor circuit to provide a portion of the primary progressive award pool to the gaming device associated with the winning condition; and allocate a second portion of each wager of the plurality of wagers to a secondary progressive award pool, wherein the instructions to provide the secondary progressive award cause the processor circuit to provide a portion of the secondary progressive award pool each active gaming device of the subset of active gaming devices.

5. The system of claim 1, wherein the instructions that provide a secondary progressive award further cause the processor circuit to:

transmit a message to each active gaming device of the subset of active gaming devices, the message comprising an instruction that causes the active gaming device to provide the secondary progressive award to a user of the active gaming device associated with the active gaming session.

6. The system of claim 1, wherein the instructions that determine the subset of active gaming devices further cause the processor circuit to:

determine, for each gaming device of the plurality of eligible gaming devices, whether the gaming device meets a predetermined activity condition.

7. The system of claim 6, wherein the subset of active gaming devices comprises all of the eligible gaming devices that meet the predetermined activity condition.

8. The system of claim 6, wherein the instructions that determine the subset of active gaming devices further cause the processor circuit to:

determine a number of available secondary progressive awards, wherein the subset of active gaming devices comprises a number of active gaming devices that does not exceed the number of available secondary progressive awards.

9. The system of claim 6, wherein the predetermined activity condition comprises a minimum wagering amount at the respective gaming device.

10. The system of claim 6, wherein the predetermined activity condition comprises a wager placed at the respective gaming device within a predetermined amount of time.

11. The system of claim 6, wherein the predetermined activity condition comprises a minimum wagering rate at the respective gaming device.

12. The system of claim 6, wherein the predetermined activity condition comprises a wager placed by a registered player associated with the wide-area progressive wagering game.

13. The system of claim 1, wherein the plurality of eligible gaming devices comprises a plurality of electronic gaming machines.

14. The system of claim 1, wherein the plurality of eligible gaming devices comprises a plurality of lottery terminals.

15. The system of claim 1, wherein the plurality of eligible gaming devices comprises a plurality of mobile devices.

16. A gaming device comprising:

a dispenser;

a processor circuit; and a memory comprising machine-readable instructions that, when executed by the processor circuit, cause the processor circuit to:

receive a first message from a progressive wagering game server, the first message comprising instructions that cause the processor circuit to:

determine whether the gaming device meets a predetermined activity condition; and transmit a responsive message to the progressive wagering game server, the responsive message comprising an indication of whether the gaming device meets the predetermined activity condition; and receive a second message from a progressive wagering game server, the second message comprising instructions that cause the processor circuit to cause the dispenser to dispense a secondary progressive award comprising a non-monetary limited inventory merchandise item to a user of the gaming device associated with the predetermined activity condition.

17. A method comprising:

determining, by a processor circuit, that a winning condition for a wide-area progressive wagering game has been satisfied for a gaming device of a plurality of eligible gaming devices;

determining, for each gaming device of the plurality of eligible gaming devices, whether the gaming device meets a predetermined activity condition;

determining a subset of active gaming devices of the plurality of eligible gaming devices, each active gaming device of the subset of active gaming devices meets the predetermined activity condition, wherein a number of active gaming devices in the subset does not exceed the number of available secondary progressive awards;

providing a primary progressive award to a user of the gaming device associated with the winning condition; and dispensing a secondary progressive award from the number of available secondary progressive awards, each secondary progressive award comprising a limited inventory non-monetary award to each gaming device of the determined subset of active gaming devices.

* * * * *